United States Patent [19]

Noma et al.

[11] Patent Number: 4,947,917
[45] Date of Patent: Aug. 14, 1990

[54] RADIAL TIRE FOR MOTORCYCLE

[75] Inventors: Hiroyuki Noma, Kobe; Tadao Kouno, Sakaishi; Kazuo Kadomaru, Ibaragi, all of Japan

[73] Assignee: Sumitomo Rubber Industries, Ltd., Hyogo, Japan

[21] Appl. No.: 323,802

[22] Filed: Mar. 15, 1989

[30] Foreign Application Priority Data

Mar. 15, 1988 [JP] Japan .................................. 63-61126
Jan. 24, 1989 [JP] Japan .................................. 1-16559

[51] Int. Cl.$^5$ .............................................. B60C 9/18
[52] U.S. Cl. .................................... 152/536; 152/554; 152/560
[58] Field of Search ............... 152/526, 527, 529, 536, 152/537, 538, 548, 560, 454, 554

[56] References Cited

U.S. PATENT DOCUMENTS

| | | | |
|---|---|---|---|
| 3,287,324 | 11/1966 | Sweeny | 524/606 X |
| 3,404,721 | 10/1968 | Massoubre | 152/536 X |
| 3,675,703 | 7/1972 | Watts et al. | 152/536 X |

FOREIGN PATENT DOCUMENTS

| | | | |
|---|---|---|---|
| 294153 | 12/1988 | European Pat. Off. | 152/538 |
| 2120179 | 11/1983 | United Kingdom | 152/454 |

OTHER PUBLICATIONS

J. Preston, "Aramid Fibers," Encyclopedia of Chemical Technology, Kirk–Othmer, ed., 3rd ed., 1978, pp. 213-242.

Primary Examiner—Michael W. Ball
Assistant Examiner—Geoffrey L. Knable
Attorney, Agent, or Firm—Birch, Stewart, Kolasch & Birch

[57] ABSTRACT

A radial tire for a motorcycle comprising a carcass ply and a breaker disposed radially outside thereof and comprising a first ply lying on the carcass ply and a second ply lying radially outside the first ply, wherein the carcass ply is composed of cords arranged radially at an angle of 70 to 90 degrees to the tire equator and having an elastic modulus MC of 250 to 600 kgf/sq.mm; the first ply of the breaker being composed of cords arranged at an angle of 10 to 30 degrees to the tire equator and having a elastic modulus MB1 of 450 to 1100 kgf/sq.mm; the second ply of the breaker being composed of aromatic polyamide cords arranged at an angle of 10 to 30 degrees to the tire equator and having a elastic modulus MB2 of 650 to 1600 kgf/sq.mm; the elastic modulus MB2 of the second ply cords being larger than the elastic modulus MB1 of the first ply cords; the elastic modulus MB1 of the first ply cords being larger than the elastic modulus MC of the carcass ply cords; and the difference MB2−MB1 and the difference MB1−MC are in the range of 200 to 500 kgf/sq.mm.

2 Claims, 3 Drawing Sheets

RADIAL TIRE FOR MOTORCYCLE

BACKGROUND OF THE INVENTION

The present invention relates to a radial tire for a motorcycle improved in high-speed performance.

In general, widely used for the carcass of a motorcycle tire is a cross-ply structure, in which the carcass plies are crossed with each other so that the carcass cords are laid at 25 to 60 degrees with respect to the circumferential direction of the tire.

The reason is that the requirements for motorcycles are radically different from those for four-wheel vehicles such as passenger cars, particularly, with respect to the operation during cornering.

A motorcycle is tilted during cornering at a extremely large camber angle of max. 40 to 55 degrees with respect to a plane perpendicular to the road surface, while the camber angle in a four-wheel vehicle is generally 3 to 4 degrees.

The centrifugal force at cornering is balanced with a force (camber thrust) generated in parallel to the road surface at the tire ground contacting zone in the direction of the chamber angle when the motorcycle is tilted.

Accordingly, it is necessary for the motorcycle tires to have such characteristics as being able to generate a stable camber thrust to run stably and safely. That is, the motorcycle tires must be laterally stiffened.

In the past, therefore, the cross-ply carcasses were used as described above so as to provide a camber thrust, and radial-ply carcasses having less lateral stiffness were seldom used.

The cross-ply tires have however, such drawbacks that weave phenomenon (transverse vibrations of the motorcycle frame resulting from the lateral stiffness of the tire) occurs during high-speed straight running, and that the wear resistance is low.

As counter-measures to such problems, adjusting the carcass cord arrangement angle and increasing the number of carcass plies have been made, but the drawbacks attributable to the cross-ply structure sill cannot completely be removed as far as the cross-ply structure is employed.

Therefore, recently, to solve the above-mentioned drawbacks of the cross-ply structure, there have been developed radial-ply tires of which the sidewall portions are increased in rigidity to provide lateral stiffness.

However, it has been known that separation of breaker edge portions from the surrounding rubber frequently occurs when a radial-ply structure is applied to a motorcycle tire, unsimilarly to passenger car tires, for the following reasons.

In motor cycle tires, as shown typically in FIG. 2(a), the radius of curvature of the tread is small, that is, the camber value H/L is large, and the breaker comprises at least one ply of cords which ply extends across the whole width of the tread. As a result, the tension in the breaker cords in the tread center regions is different from that in the tread edge regions, and thus stress concentrates in the breaker edges.

Further, because of the high rigidity of the sidewall portions and the small radius of curvature of the tread crown region, the deformation of the tire during running becomes great, particularly from the shoulder portion to the buttress portion as shown in FIGS. 2a and 2b, and the radius of curvature of the inner surface of the tire shoulder is decreased to R2 (FIG. 2b) from R1 (FIG. 2a) when the tread is deformed into the ground contacting state of FIG. 2(b) from the free state of FIG. 2(a).

As the breaker edges B are laid in such greatly deformed regions, a great shear stress is generated around the breaker edges.

If supper high elastic modulus and high tensile strength cords such as steel cords, general aromatic polyamide cords and the like are used as the breaker cords of radial tire, for the purpose of improving durability against such deformation and stress concentration together with the steering stability and the resistance to wear, then the difference in elastic modulus between the breaker cords and the carcass cords becomes more than 3000 kgf/sq.mm, which is too large.

Therefore, the shearing stress induced by the above-mentioned deformations is so increased that the ply separation is more accelerated.

Accordingly, to prevent ply separation by reducing the great step-difference in elastic modulus between the carcass cords and the breaker cords, low elastic modulus breaker cords made of the same material as of the carcass cords or a similar material, for example, nylon cords and the like have sometimes been used.

However, in the tires provided with a nylon breaker, the rigidity of the ground contacting region of the tread becomes low, and the resistance to wear and the steering stability are impaired.

Furthermore, due to the heat generation of the tire during running, the elastic modulus of such low modulus cords becomes still lower. As the result, the growth of the tire is induced, and the durability and the steering stability are deteriorated.

On the contrary, if high elastic modulus cords the same as or similar to the breaker cords, for example, steel cords, general aromatic polyamide cords and the like, are used as the carcass cords, then the rigidity of the tire as a whole become too large so that riding comfort and steering stability become impaired.

It is, therefore, an object of the present invention to provide a radial tire for a motorcycle, in which the above-mentioned problems are completely solved to prevent ply-separation at the breaker edge portions, and to improve the durability of the tire without deteriorating the resistance to wear, the steering stability and the riding comfort.

SUMMARY OF THE INVENTION

According to one aspect of the present invention, a radial tire for a motorcycle comprises:
   a carcass ply which is extended between bead portions of the tire and turned up at the edge portions thereof around a pair of bead cores one disposed in each bead portion; and
   a breaker which is disposed radially outside the carcass ply and comprising a first ply lying on the carcass ply and a second ply lying radially outside the first ply, wherein
   the above-mentioned carcass ply is composed of cords having an elastic modulus MC of 250 to 600 kgf/sq.mm and arranged radially at an angle of 70 to 90 degrees to the tire equator,
   the first ply of the breaker is composed of cords having a elastic modulus MB1 of 450 to 1100 kgf/sq.mm and arranged at an angle of 10 to 30 degrees to the tire equator,
   the second ply of the breaker is composed of aromatic polyamide cords having a elastic modulus MB2 of 650 to 1600 kgf/sq.mm and arranged at an angle of 10 to 30 degrees to the tire equator, the elastic modulus MB2 of the second ply cords is larger than the elastic modulus MB1 of the first ply cords, and the elastic modulus MB1 of the first ply cords is larger than the elastic modulus MC of the carcass ply cords.

Preferably, the difference MB2−MB1 and the difference MB1−MC are set in a range of 200 to 500 kgf/sq.mm.

In the present invention, the elastic modulus of a cord means what is called an initial elastic modulus, and in practice, the modulus is defined in the following manner:

to load the cord with a small load less than 5 kgf/cord to plot a load/elongation curve (which is generally linear in such a small load range), to extend the plotted rising curve to a point of 10% elongation with the same inclination, to read the load F corresponding to 10% elongation of the cord, to obtain the sectional area S of the cord, and to calculate the following equation:

Elastic Modulus of Cord=$F/S \times 10$

BRIEF DESCRIPTION OF THE DRAWINGS

An embodiment of the present invention will now be described in detail, by way of example only, with reference to the accompanying drawings, in which.

DETAILED DESCRIPTION OF THE INVENTION

Figure 1:
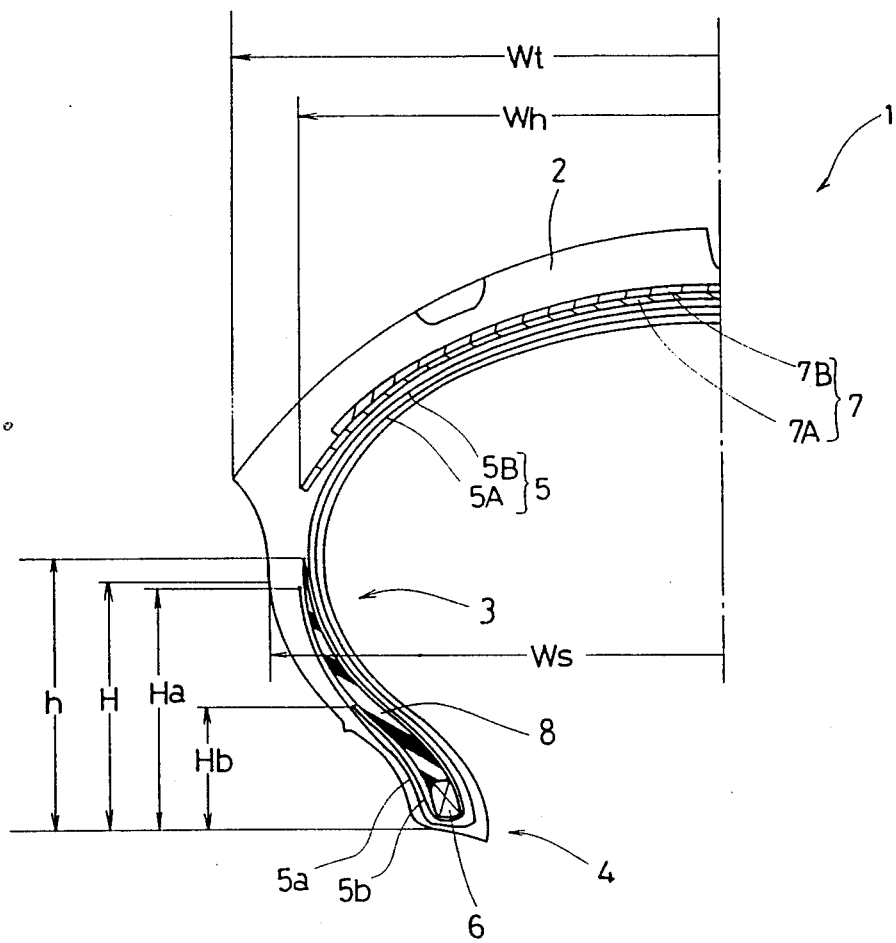
FIG. 1 is a sectional view showing an embodiment of the present invention.

In FIG. 1, the tire 1 has a tread portion 2, a pair of sidewall portions 3 extending radially inwardly one from each tread edge, and a pair of bead portions 4 each positioned at the radially inward end of each sidewall portions. The tire comprises a radial carcass 5 extending between the bead portions through the sidewall portions and the tread portion, a pair of bead cores 6 one disposed in each head portion, a tread disposed radially outside the carcass defining the tread portion, and a pair of sidewalls disposed on the outer side of the carcass.

The carcass 5 in this embodiment is composed of two plies 5A and 5B of cords. The edges of at least one of the carcass plies, in this example the edges of each of the two carcass plies, are folded around the bead cores 6 from the inside to the outside thereof, and they are terminated above the bead cores 6 in the upper bead portions 4 or in the sidewall portions 3.

Preferably, the end of the axially outer folded portion 5a of the carcass ply 5A extends radially outwardly beyond the end of the axially inner folded portion 5b of the carcass ply 5B so that the outer folded portion 5a covers the end of the inner folded portion 5b, which can mitigate the stress concentration on the end of the inner folded portion 5b.

Further, it is preferable to reinforce the sidewall portions of the tire, by arranging the heights Hb and Ha of the inner folded portion 5b and the outer folded portion 5a from the bead base, within a range of 55 to 65% of and a range of 70 to 150% of the height H of the point of the maximum tire section width Ws in the sidewall region of the tire, respectively.

In this example, the height Ha of the outer folded portion 5a of the carcass ply is nearly the same as the height H of the point of the maximum tire section width Ws.

The tread is disposed over the crown of the carcass 5, and the sectional shape thereof is set so that the the contour thereof becomes substantially parallel to the outer face of the carcass or the thickness thereof decreases gradually from the tread center toward the tread edges.

The axial width Wt of the tread is larger than the maximum tire section width Ws measured at the sidewall portions, which allows the camber thrust generated when the tire is tilted to be taken by the tire even when steeply banked over.

The cords in each carcass ply 5A, 5B are arranged at an angle of 70 to 90 degrees with respect to the tire equator. If the angle of this cord arrangement is smaller than 70 degrees, then the improvement in tire performance at high speed running is not achieved.

For the carcass cords, organic fiber cords with a elastic modulus in a range of 250 to 600 kgf/sq.mm, such as nylon 6, nylon 6—6, rayon, polyester or high-modulus polyester cords, are used. In the case that 840 to 1890 denier fiber cords are used, such cords are preferably embedded in a rubber having a 100% modulus of 10 to 50 kgf/sq.cm at a density ranging from 35 to 60 cords/5 cm.

According to the present invention, the carcass can be composed of one or more plies, and as an alternative to the construction in which the carcass ply is turned up around the bead cores from the inside to the outside thereof as shown in FIG. 1, a construction in which the carcass ply is turned up from the outside to the inside of the bead cores may be applied to the carcass. Further, a combination construction of the former two may be applied thereto in case of the carcass of plural plies.

A breaker 7 is disposed radially outside the crown of the carcass 5 and inside the tread. The breaker 7 in this example is composed of two plies 7A and 7B of parallel cords: the first ply 7A dispose on the radially outside of the carcass and the second ply 7B disposed on the radially outside thereof.

The cords in the breaker 7 arranged at 10 to 30 degrees to the tire equator. If the cord arrangement angle is smaller, the tread stiffness is excessively increased so that impacts caused by pebbles on the road or roughness of the road becomes strongly felt by the driver, and running stability as well as the ride comfort is hampered. On the other hand, the running stability at high speed running is hindered, if the angle is larger.

The breaker plies are varied in width from each other to shift the positions of the edges of each ply from those of another ply, whereby the stress concentration on the breaker edges is eased.

To gain a full hoop effect all over the width of the tread, the width of at least one of the plies, in this example the width Wh of the inner first ply 7A, is set to be substantially equal to the tread width Wt.

The inner first ply 7A is composed of organic fiber cords with an elastic modulus being in a range of 450 to 1100 kgf/sq.mm.

The outer second ply 7B is composed of aromatic polyamide cords with a cord elastic modulus being in a range of 650 to 1600 kgf/sq.mm.

Further, the outer second ply 7B is larger in elastic modulus than the inner first ply 7A, and the difference therebetween is in a range of 200 to 500 kgf/sq.mm.

The elastic modulus in each ply has to be increased radially outwardly from the inner first ply to the outer second ply in the limit between 200 and 500 kgf/sq.mm.

Accordingly, the tread is improved in rigidity, while the step difference in rigidity between radially adjacent breaker plies is decreased into a narrow range.

As a result, the stress concentration on the breaker ply edges caused by the repeated deformation during running is lessened, and thereby the ply-separation at the breaker edges is effectively prevented.

In general, aromatic polyamide fiber cords have been well known as a cord having high elastic modulus of more than 3700 kgf/sq.mm and high tensile strength, and to put such characteristics to practical use, various efforts to develop new uses thereof and how to use such a high modulus materials have been made.

In the present invention, however the aromatic polyamide fiber cord used for the breaker has a comparatively low modulus ranging from 650 to 1600 kgf/sq.mm.

The reason why such a low modulus aromatic polyamide cords are used is that an aromatic polyamide fiber cord has less dependence upon temperature change in both the rigidity and the dimensions, that is, it has characteristics being less changed by the temperature change. This is an important aspect of the present invention.

Thereby, the strain induced in the cords at the breaker edges by the radius of curvature of the tread crown being small becomes lowered, and the tire-growth accompanied with high heat generation during high speed running is prevented. Thus the tire rigidity is uniformed, and the resistance to wear and the high-speed durability are further enhanced.

Furthermore, for the cords of the inner first ply 7A, polyester or high-modulus polyester fiber cords can be used, but more preferably aromatic polyamide fiber cords are used to further reduce the tire-growth.

As aromatic polyamide fiber cords having such low modulus of elasticity, it is preferable to use high-extensibility cords for the inner first ply 7A and high-extensibility cords or medium-extensibility cords for the outer second ply 7B.

Figure 3:
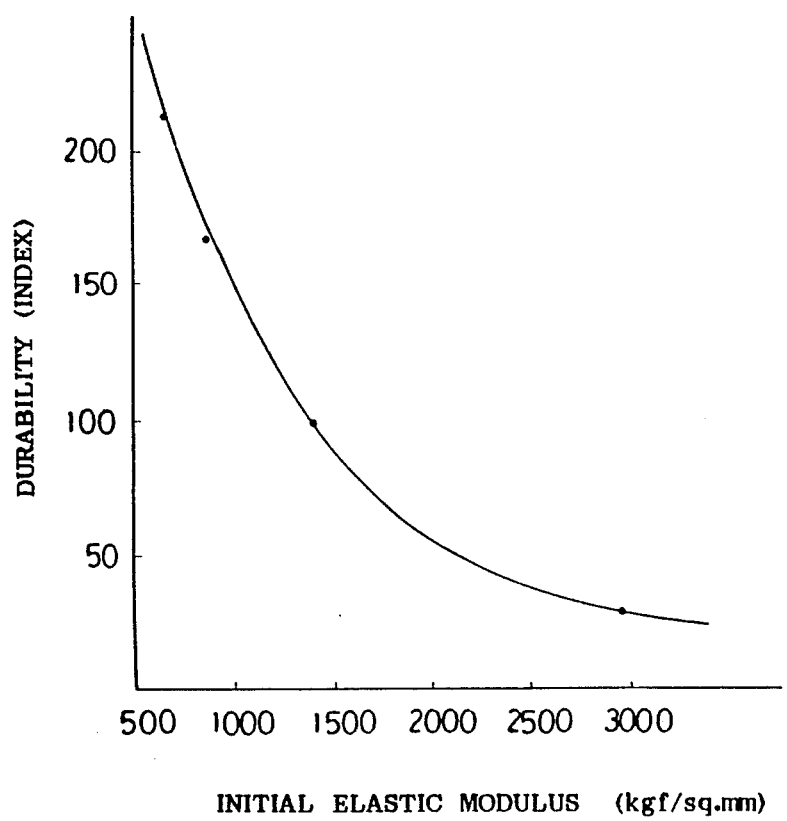
FIG. 3 is a graph showing the relationship between the durability and the elastic modulus of aromatic polyamide.

FIG. 3 shows a relationship between the elastic modulus and tire durability evaluated by a drum tester, wherein the tire durability is expressed by the resistance to ply-separation caused by tire rotations using an index.

It is apparent from FIG. 3 that the durability increases in accordance with the decrease in the modulus. In practice, however, the lower limit of the elastic modulus for the breaker cords is determined to balance the longitudinal rigidity to the lateral rigidity which are required for the tire characteristics such as hoop effect, camber thrust and steering stability, and the lower limit was defined as 650 kgf/sq.mm.

The reason why the difference in elastic modulus is set to be in the range of 200 to 500 kgf/mm is as follows:

If it is less than 200 kgf/sq.mm, then the rigidity of the tread portion as a whole becomes low, and the resistance to wear is greatly deteriorated (Ref. 4).

On the contrary, if it is more than 500 kgf/sq.mm, a ply separation between the carcass ply and the breaker ply is apt to be induced, and accordingly improvement in tire durability can not be expected (Ref. 1, 2, 3 and 5).

As one of modifications of the breaker 7, there can be used such a three-ply breaker as being provided with a third ply on the radially outside of the above-mentioned second ply 7B.

In this case, for the cords of the third ply, aromatic polyamide fiber cords having an elastic modulus ranging from 850 to 2100 kgf/sq.mm and being larger than that of the second ply in the limit of 200 to 500 kgf/sq.mm are used.

Thereby, it becomes possible to further increase the resistance to wear.

As described above, according to the present invention, the cords which are used in the tire for the carcass and the breaker lie more outward in the radial direction of the tire, and the elastic modulus is larger.

That is, the tire cords including the carcass cords and the breaker cords are increased radially outwardly and gradually with the narrowly limited small step-differences. Accordingly, the rigidities of the cord plies are also increased radially outwardly and gradually without a great step-difference between them or rather with a proper small difference.

Furthermore, while maintaining the resistance to wear, the steering stability and the ride-comfort, the high-speed durability can be greatly improved by less cord strain at the breaker ply edges due to the low elastic modulus of the breaker cords, and by the stability of the aromatic polyamide fiber cords against temperature change.

Further, the tire is provided in each bead portion 4 with a bead apex 8. The bead apex is disposed between the main portion and the folded portions (5a, 5b) of the carcass so as to reinforce the tire, from the bead portion 4 to the sidewall portion 3.

The bead apex is made of a hard rubber and the hardness of the bead apex is in a range of 65 to 95 in Shore A. The bead apex is extended taperingly from the bead core 6 to the sidewall portion, and the height h of the upper end of the bead apex from the bead base is preferably in a range of 20 to 50% of the tire section height.

Figure 2A:
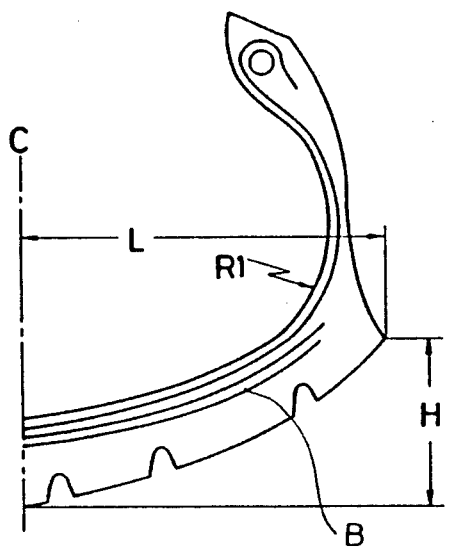
FIGS. 2(a) and 2(b) are schematic sectional views showing an unloaded state and a loaded ground contacting state of a tire, respectively.
Figure 2B:
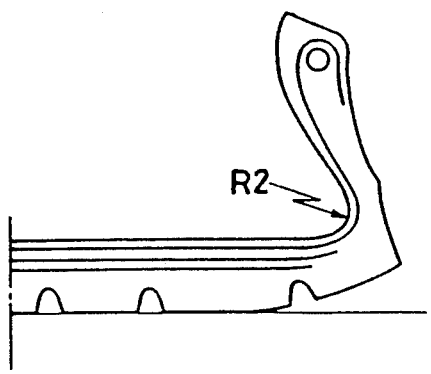

In the tire sectional shape, the camber value is preferably set to be more than 0.2, and more preferably more than 0.3, wherein the camber value is, as shown in FIG. 2(a), defined as the ratio (H/C) of the radial distance H between the tread edge and the tread center to the axial distance L between the tread edge and the tire equator.

Test tires of size 140/80-17 for rear wheel were made by way of trial according to the structure shown in FIG. 1, and the details thereof are given in Table 1.

The test tires were tested to evaluate their durability, resistance to wear, and resistance to weave phenomenon.

The test results are also shown in Table 1, wherein the results are expressed by an index based on the assumption that the result of the tire of Ref. 1 according to a prior art is 100 . The higher the value, the better the performance.

The durability test was performed by using a 60 inche dia. drum tester, and the time to tire failure was measured under the following conditions: the tire load of 150% of the maximum load regulated in JATMA standard, the inner air pressure of 2.25 kgf/sq.cm, and the running speed of 65 km/h.

The value of camber thrust is the average of the test data measured at camber angles of 20, 30 and 40 degrees under the following conditions: the internal air pressure of 2.8 kgf/sq.cm and the tire load of 320 kgf.

The wear resistance test was carried out in a circuit course, and the wear was measured after the motorcycle provided on the rear wheel with the test tire ran over 1500 km at the average speed of 180 km/h under the following conditions: the internal air pressure of 2.0 kgd/sq.cm in the front tire and 2.25 kgf/sq.cm in the rear tire.

The test for the resistance to weave phenomenon was also carried out by a skilled test rider in a circuit course to determine by the rider's feel the speed at which vehicle vibration is naturally generated during running.

As apparent from Table 1, the working examples of the present invention Ex.1–5 were considerably improved in endurance durability, while maintaining the other good characteristics from the radial structure such as wear resistance, camber thrust (cornering performance) and ride comfort.

In particular, Ex.3 to 5, in which aromatic polyamide cords whose elastic modulus is in a range of 450 to 1100 kgf/sq.mm were used for the first breaker ply, displayed a highly balanced performance.

radially outwardly located order. This can suitably increase the tread stiffness, while keeping the rigidity-gap between the adjacent plies in a specific narrow range, which have never been attained in the prior art. Therefore, the wear resistance is maintained, and the ply-separation in the breaker edges is lessened, while ply-separation is often caused in case of a breaker of supper high modulus cords such as steel cords or the general aromatic polyamide cords.

Furthermore, the aromatic polyamide cords which have a comparatively low elastic modulus but a high resistance to heat is used for the second ply of the breaker, whereby the variations of breaker in elastic modulus and dimensions caused by the temperature increase during high-speed running can be effectively controlled. And further, by reducing cord strain at the breaker ply edges due to the low elastic modulus of the breaker cords, and due to the stability of the aromatic polyamide fiber cords against temperature change, the steering stability the ride-comfort and the structural endurance durability is greatly improved, while the wear resistance maintained.

The invention being thus described, it will be obvious

TABLE 2

| Test tire | Ex. 1 | Ex. 2 | Ex. 3 | Ex. 4 | Ex. 5 | Ref. 1 | Ref. 2 | Ref. 3 | Ref. 4 | Ref. 5 |
|---|---|---|---|---|---|---|---|---|---|---|
| CARCASS | | | | | | | | | | |
| Construction | radial | radial | radial | radial | radial | radial | radial | radial | radial | radial |
| No. of plies | 2 | 2 | 2 | 2 | 2 | 2 | 2 | 2 | 2 | 2 |
| Cord angle (deg) | 88 | 88 | 88 | 88 | 88 | 88 | 88 | 88 | 88 | 88 |
| Cord material | N6 | N66 | N66 | PE | HM-PE | N6 | N66 | N66 | N6 | N6 |
| Cord thickness | 1260d/2 | 1260d/2 | 1260d/2 | 1500d/2 | 1500d/2 | 1260d/2 | 1260d/2 | 1260d/2 | 1260d/2 | 1260d/2 |
| Modulus (kgf/sq. mm) | 285 | 345 | 345 | 456 | 600 | 285 | 345 | 345 | 285 | 285 |
| BREAKER | | | | | | | | | | |
| No. of piles | 2 | 2 | 2 | 2 | 2 | 2 | 2 | 2 | 2 | 2 |
| Cord angle (deg) | 17 | 17 | 17 | 17 | 17 | 17 | 17 | 17 | 17 | 17 |
| Cord material | | | | | | | | | | |
| 1st ply | PE | HM-PE | HE-APA | HE-APA | ME-APA | LE-APA | LE-APA | Steel | PE | HE-APA |
| 2nd ply | HE-APA | ME-APA | ME-APA | ME-APA | LE-APA | LE-APA | Steel | Steel | HM-PE | LE-APA |
| Modulus (kgf/sq. mm) | | | | | | | | | | |
| 1st ply | 456 | 600 | 700 | 950 | 1100 | 3700 | 3700 | 16000 | 456 | 890 |
| 2nd ply | 660 | 1100 | 1200 | 1450 | 1600 | 3700 | 16000 | 16000 | 600 | 1600 |
| BEAD APEX | | | | | | | | | | |
| Shore A hardness | 92 | 92 | 92 | 92 | 92 | 92 | 92 | 92 | 92 | 92 |
| Height h (mm) | 40 | 40 | 40 | 40 | 40 | 40 | 40 | 40 | 40 | 40 |
| Durability (index) | 125 | 125 | 125 | 115 | 120 | 100 | 75 | 70 | 110 | 100 |
| Camber thrust (index) | 100 | 105 | 105 | 105 | 105 | 100 | 105 | 105 | 100 | 105 |
| Wear resistance (index) | 95 | 98 | 100 | 100 | 100 | 100 | 110 | 115 | 85 | 100 |
| Vibration naturally generating speed (index) | 100 | 100 | 100 | 100 | 100 | 100 | 100 | 100 | 100 | 100 |

N6 Nylon-6
N66 Nylon-66
PE Polyester
HM-PE High-Modulus Polyester
HE-APA High-Extensible Aromatic Polyamide
ME-APA Medium-Extensible Aromatic Polyamide
LE-APA Low-Extensible Aromatic Polyamide As described above, according to the present invention, the tire is provided with a radial construction, and the cords having an elastic modulus ranging from 250 to 600 kgf/sq.mm are used as the carcass cords, whereby the rigidity of the tire is suitably eased so as to maintain the steering stability and the riding comfort.

Further, the inner first ply and outer second ply of the breaker are 450 to 1100 kgf/sq.mm and 650 to 1600 kgf/sq.mm, respectively, in elastic modulus. And the plies of the carcass and breaker are gradually increased in elastic modulus, radially outwardly, that is, in the that the same may be varied in many ways. Such variations are not to be regarded as a departure from the spirit and scope of the invention, and all such modifications as would be obvious to one skilled in the art are intended to be included within the scope of the following claims.

We claim:
1. A radial motorcycle tire comprising:
   a pair of bead cores one disposed in each bead portion of the tire;

a carcass ply extending between the bead portions and turned up at the edge portions thereof around the bead cores; and a breaker disposed radially outside said carcass ply and comprising a first ply lying adjacent to the carcass ply and a second ply lying radially outside the first ply, said carcass ply composed of cords having an elastic modulus MC of 250 to 600 kgf/sw.mm and arranged radially at an angle of 70 to 90 degrees to the tire equator;

said first ply of the breaker composed of cords having an elastic modulus MB1 of 450 to 1100 kgf/sq.mm and arranged at an angle of 10 to 30 degrees to the tire equator;

said second ply of the breaker composed of aromatic polyamide cords having an elastic modulus MB2 of 650 to 1600 kgf/sq.mm and arranged at an angle of 10 to 30 degrees to the tire equator;

said elastic modulus MB2 of the second ply cords being larger than said elastic modulus MB1 of the first ply cords and the first elastic modulus MB1 of the first ply cords being larger than said elastic modulus MC of the carcass ply cords.

2. The radial motorcycle tire as set forth in claim 1, wherein the difference in elastic modulus between the radially adjacent plies including the carcass ply and the breaker plies is in a range of 200 to 500 kgf/sq.mm.

* * * * *